Sept. 17, 1929.  R. MICHL  1,728,692
ELECTRIC CLOCK DRIVE
Original Filed March 17, 1922
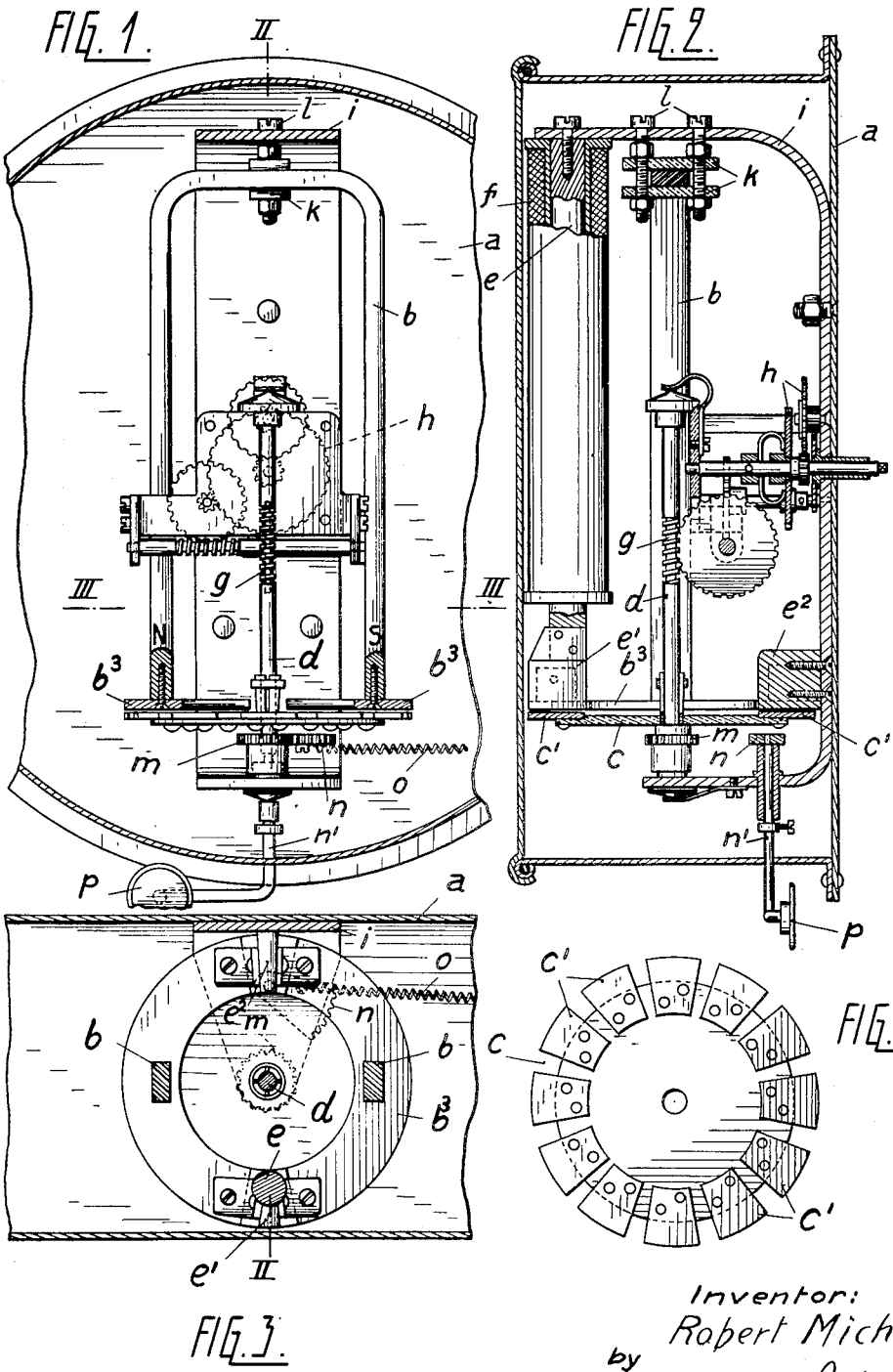
Inventor:
Robert Michl
by Marks & Clerk
Attys.

Patented Sept. 17, 1929

1,728,692

UNITED STATES PATENT OFFICE

ROBERT MICHL, OF KOSICE, CZECHOSLOVAKIA

ELECTRIC CLOCK DRIVE

Original application filed March 17, 1922, Serial No. 544,639, and in Czechoslovakia January 17, 1922. Divided and this application filed October 18, 1927. Serial No. 227,035.

The original specification filed March 17, 1922, with the Serial Number 544,639, from which this application has been divided.

This invention relates to electric clock-drives of the type in which a rotating synchronous alternating current motor is employed as driving means. There exists a constructional form of this type in which an electro-magnet carrying an alternating current coil and fastened to a permanent magnet at the neutral point of the same extends only with one of its poles into the range of the rotor which, therefore, is subjected to the action of an odd number of poles.

Now, the present invention is based on the discovery that the energy sent into the motor can be used still more efficaciously if both poles of the electro-magnet can act upon the rotor. This is attained, according to the present invention by the feature that the second pole of the electro-magnet is magnetically insulated from the permanent exciting magnet and is extended by means of a pole-shoe to and into the working range of the other three poles.

A particularly practical constructional form is obtained by making use of a bow as conducting or transmitting pole-shoe for the second pole, as a bow permits to attach to it the two magnets, as well as the supporting members for the clock-work and for the rotor. It is then possible to arrange the rotor axle vertically in a simple manner whereby the friction of the rotor is reduced, and at the same time a flat casing is obtained as desired just for clocks. It is suited to the purpose to provide also a speed-accelerating device in order to be in the position to raise the number of revolutions of the rotor when starting the motor quickly to synchronism.

The invention is illustrated diagrammatically and by way of example on the accompanying drawing on which Figure 1 is a front-view of the motor mounted in the casing, the motor being shown partly in section, and the lateral portions of the casing being broken away; Figure 2 is a section in the plane 2—2 of Fig. 1, Figure 3 a section in the plane 3—3 of Fig. 1, and Figure 4 a plan of the rotor of the motor, all as fully described hereinafter.

On the drawing, $i$ denotes an iron bow attached to the casing $a$ and carrying the electromagnet $e$ with its alternating current coil $f$. The free pole of the electromagnet extends with its pole-shoe $e^1$ into the range of the rotor $c$ which is affixed to a vertical shaft $d$. The bow $i$ serves as second pole and is, for this purpose, provided with a pole-shoe $e^2$ located opposite the pole-shoe $e^1$. The permanent exciting magnet $b$ is affixed the bow $i$ by means of disks $k$ and screws $l$ consisting of a magnetically non-conducting material. The two poles of the magnet $b$ lie symmetrically between the poles $e^1 e^2$. It is suited to the purpose to provide the two poles N and S of the exciting magnet $b$ with sector-shaped pole-shoes $b^3$ so that their range of action extends as far as possible to the pole-shoes of the electromagnet $e$.

The rotor consists of a disk $c$ of a magnetically nonconductive material, and of magnetically conductive pole-change segments $c^1$ which pass along below the poles $b^3$ $e^1$ $e^2$. The revolutions of the disk are transmitted to the clock-work $h$ by means of the worm-gearing $g$.

In order to facilitate starting the synchronous motor and to raise its number of revolutions quickly to the number of periods of the alternating current, a speed-accelerating device may be combined with the other parts. There is provided for this purpose, in the example shown, a cog-wheel $m$ upon the shaft $d$ of the rotor, and a sector $n$ normally retained by a spring $o$ can engage said wheel. The shaft $n^1$ of the sector extends outwardly and is provided at its outer end with a button $p$. The outer end of the shaft $n^1$ is bent like a crank and can be turned by a pressure exerted upon the button $p$. When this is done, the sector $n$ is turned to the right (Fig. 2) and the spring $o$ is at the same time put under tension. When then the button $p$ is relieved from the pressure, the spring will pull the sector $n$ back into its former position and now the sector will engage the cog-wheel $m$ whereby the rotatory speed of the motor shaft will be accelerated.

Arranging the shaft $d$ vertically, as rendered possible by the particular constructional form constituting the subject-matter of the invention, presents the important advantage that not only the two bearings of the shaft $d$ can run in oil, but the foot-pivot can rest upon a hardened steel-ball and this upon a stone. These features are important in view of the continuous running of the clock and of the quick running of the motor, as regards small frictional resistances and, therefore, little wear and tear.

The number of the pole-change segments $c$ can, of course be chosen as desired. The number shown in the drawing is merely an example; it depends upon the definite number of revolutions of the motor. Also the number of the exciting poles and of the electromagnet poles can be multiplied at liberty, and their distribution around the circumference could be effected with another angle than that used in the drawing. Finally, a drum-shaped rotor could be employed instead of the disk-shaped one.

I claim:

1. In a synchronous alternating current motor the combination of a permanent exciting magnet, an electromagnet arranged with its poles between the poles of said permanent magnet in the same plane, and a rotor with pole-change segments magnetically insulated from one another, said rotor being arranged to turn before the front of said magnet poles, substantially and for the purpose set forth.

2. In a synchronous alternating current motor the combination of a permanent exciting magnet, an electromagnet arranged with its poles between the poles of said permanent magnet in the same plane, and a rotor with pole-change segments magnetically insulated from one another, said rotor being arranged to turn before the front of said magnet poles, one of the poles of one of said magnets being a bow-shaped shoe attached to the said magnet, and carrying both said magnets, as well as the bearing members of the said rotor and a clock-work, substantially and for the purpose set forth.

In testimony whereof I affix my signature.

ROBERT MICHL.